United States Patent [19]

Chamuel

[11] 4,216,352
[45] Aug. 5, 1980

[54] TWO COORDINATE POSITION SENSING SYSTEMS

[75] Inventor: Jacques R. Chamuel, Framingham, Mass.

[73] Assignee: The Charles Stark Draper Laboratory, Inc., Cambridge, Mass.

[21] Appl. No.: 957,079

[22] Filed: Nov. 2, 1978

[51] Int. Cl.$^2$ ............................................. G08C 21/00
[52] U.S. Cl. ................................................... 178/19
[58] Field of Search .............. 178/18, 19, 20; 33/1 M; 340/11, 17 R; 181/111, 112, 125

[56] References Cited

U.S. PATENT DOCUMENTS

| | | | |
|---|---|---|---|
| 3,121,955 | 2/1964 | King | 33/1 |
| 3,846,580 | 11/1974 | Brenner | 178/19 |
| 3,904,821 | 9/1975 | Whetstone et al. | 178/19 |
| 4,018,989 | 4/1977 | Snyder et al. | 178/19 |
| 4,035,762 | 7/1977 | Chamuel | 178/19 |
| 4,081,603 | 3/1978 | Davis et al. | 178/19 |
| 4,121,155 | 10/1978 | Chamuel | 178/19 |

*Primary Examiner*—Thomas A. Robinson
*Attorney, Agent, or Firm*—Robert F. O'Connell

[57] ABSTRACT

A system for determining X and Y coordinate positions on a surface wherein a first transducer generates plane waves having electromagnetic fields associated therewith, which plane waves travel along the direction of the X-coordinate and a second transducer generates plane waves having electromagnetic fields associated therewith, which plane waves travel along the direction of the Y-coordinate. A receiver transducer at the position to be determined detects the presence of the electromagnetic fields associated with the plane waves as they travel past the receiver transducer and the distances traveled by the plane waves are appropriately calculated either by determining the times of travel using pulse wave signals or by determining phase relationships using continuous wave signals.

19 Claims, 3 Drawing Figures

TWO COORDINATE POSITION SENSING SYSTEMS

INTRODUCTION

This invention relates generally to two coordinate position sensing systems and, more particularly, to the determination of a position on a surface using electromagnetic fields of traveling elastic waves in delay means.

BACKGROUND OF THE INVENTION

It is often desirable to determine the position on a surface with respect to a reference point thereon, such position often being expressed in two coordinates. For example, it is often desirable to determine the position on a planar surface with respect to a reference point of origin so that the position can be expressed in two coordinates, e.g., an X-coordinate and a Y-coordinate.

Such position determinations are required in graphical data devices wherein the position of a stylus with respect to a fixed set of reference coordinates is determined as the stylus is moved over the reference surface. Such devices, or writing tablets as they are often known, permit the user to digitize graphic points and supply their data content directly into storage for display on a screen of a data processing terminal.

An example of such a coordinate digitizing device is described in U.S. Pat. No. 3,648,277, issued to A. L. Whetstone on Mar. 7, 1972, which device utilizes a localized source of magnetic energy positioned with respect to a wire array, each of the wires of the array terminating in a common delay line. Such wire matrices are also utilized in other systems of a similar nature as described in U.S. Pat. No. 3,767,858 issued to J. L. Rodgers on Oct. 23, 1973; U.S. Pat. No. 3,851,097 issued to J. L. Rodgers on Nov. 26, 1974; and U.S. Pat. No. 3,886,311 issued to J. L. Rodgers et al. on May 27, 1975. In all such systems a grid array, or matrix, of separate wires is utilized adjacent, or embedded within, a surface on which a position is to be determined. Accordingly, the resolution and accuracy of such position determination is limited by the spacing of the wires. Moreover, the use of separate wires in a matrix form requires extremely precise positioning of such wires giving rise to an increase in the difficulties and costs of manufacture thereof, such problems being particularly pronounced in the manufacture of miniature two coordinate positioning devices requiring very high resolution.

Another presently available device has been made and sold by Tektronix, Inc. as Graphic Tablet Model No. 4953/54 and utilizes a matrix of wires in much the same manner as discussed in the above issued patents.

In view of the resolution and accuracy limitations on such devices, it is desirable to provide a device in which continuous position determination can be achieved with a much higher degree of resolution utilizing a structure which eliminates the need for a complex matrix of individual wires which must be accurately aligned in the X and Y-coordinate directions at high manufacturing costs.

Another approach is described in U.S. Pat. No. 3,838,212 issued to A. L. Whetstone et al. on Sept. 24, 1974, the device therein using a stylus which generates a spark for producing a fast rise time, sound energy shock wave at the location of the stylus. The shock wave propagates through the air and receiver devices positioned along the X and Y coordinates respond to the leading edge of the air-propagated shock wave to provide elapsed time indication for determining the X and Y coordinates.

U.S. Pat. No. 3,156,766 issued to G. M. Stamps on Nov. 10, 1964 discloses a sonar telecriber which utilizes a glass platen and requires a stylus transducer in contact with the surface thereof at a position to be determined. Arrays of piezoelectric crystals in contact with the edges of the platen detect the arrival of a mechanical pulse signal generated at the stylus to determine such position from the times of travel of the mechanical pulse signal to each array. U.S. Pat. No. 3,134,899 issued on May 19, 1964 to P. W. Woo depicts a similar system in which the piezoelectric crystal arrays are each energized by a pulse signal and the arrival of the mechanical pulse signals induced thereby in the platen at a detector transducer located in contact with the platen surface at the position to be determined is detected. The times of travel of such mechanical pulse signals then permit the position of the detector transducer to be determined.

Both the Stamps and Woo systems require the use of mechanically induced pulse signals which affect the resolution and accuracy of the position determinations due to the mechanical limitations of the geometry of the stylus and the surface irregularity of the platen. Moreover, the pressure of the contact of the stylus transducer will tend to induce multimode mechanically induced pulse signals in the platen the detection of which will be difficult for short delays. Moreover, it is not possible to induce a single longitudinal mode, continuous wave signal in the glass platen in either the Stamps or Woo systems so that the ability of such systems to provide low dispersion pulses is severely hampered. Further, the continuous contact of the moving stylus on the platen surface tends to wear out the surface and affect the capability of inducing "clean" mechanical pulse signals in the material. The costs of such systems appear to be relatively high since a large number of piezoelectric transducers are required therein, such transducers also requiring operation in the same electrical phase, which requirement raises a difficult problem in the manufacture and assembly process thereof.

Furthermore, the mechanically induced signals require a direct contact between the stylus and the platen. Therefore, in applications where it is desirable to digitize a pattern present on a material which has low acoustical conductivity, such as a rubber sheet or carpet, for example, it is not possible to induce the mechanical waves when the rubber sheet is placed on the platen between the stylus and the platen surface.

BRIEF SUMMARY OF THE INVENTION

In accordance with the invention an X-Y coordinate position determining device, as adapted, for example, for use with a planar surface, utilizes a sheet of material which can support electromagnetic fields associated with traveling elastic waves and a transducer which can be moved adjacent the surface and whose position it is desired to determine. A pair of plane-wave producing members are positioned along the desired X and Y coordinates and interact at a reference point of origin. Excitation of such members produces plane elastic waves having electromagnetic fields associated therewith in the sheet in both the X and Y directions. The movable receiver transducer (acting as an effective point source) detects the presence of the electromagnetic fields associated with each of the plane waves as they pass the position of such receiver transducer. If the elastic waves are in pulsed form, the times of travel of the plane waves from the generation to their detection at the receiver transducer provides a measurement of the distances between the receiver transducer and each of the coordinate axes. If the elastic waves are in continuous-wave form, the relative phase between the received and generated electromagnetic fields provides a measurement of such distances.

The edges of the sheet are appropriately terminated to substantially eliminate any reflections of the elastic waves therefrom.

Such X-Y coordinate position sensing system provides for effectively infinite resolution and can be manufactured at reasonable cost. The receiver transducer can be made in such a form as to be capable of operating without touching the surface of the sheet.

DESCRIPTION OF THE INVENTION

The invention can be described in more detail with the help of the accompanying drawing wherein.

Figure 1:
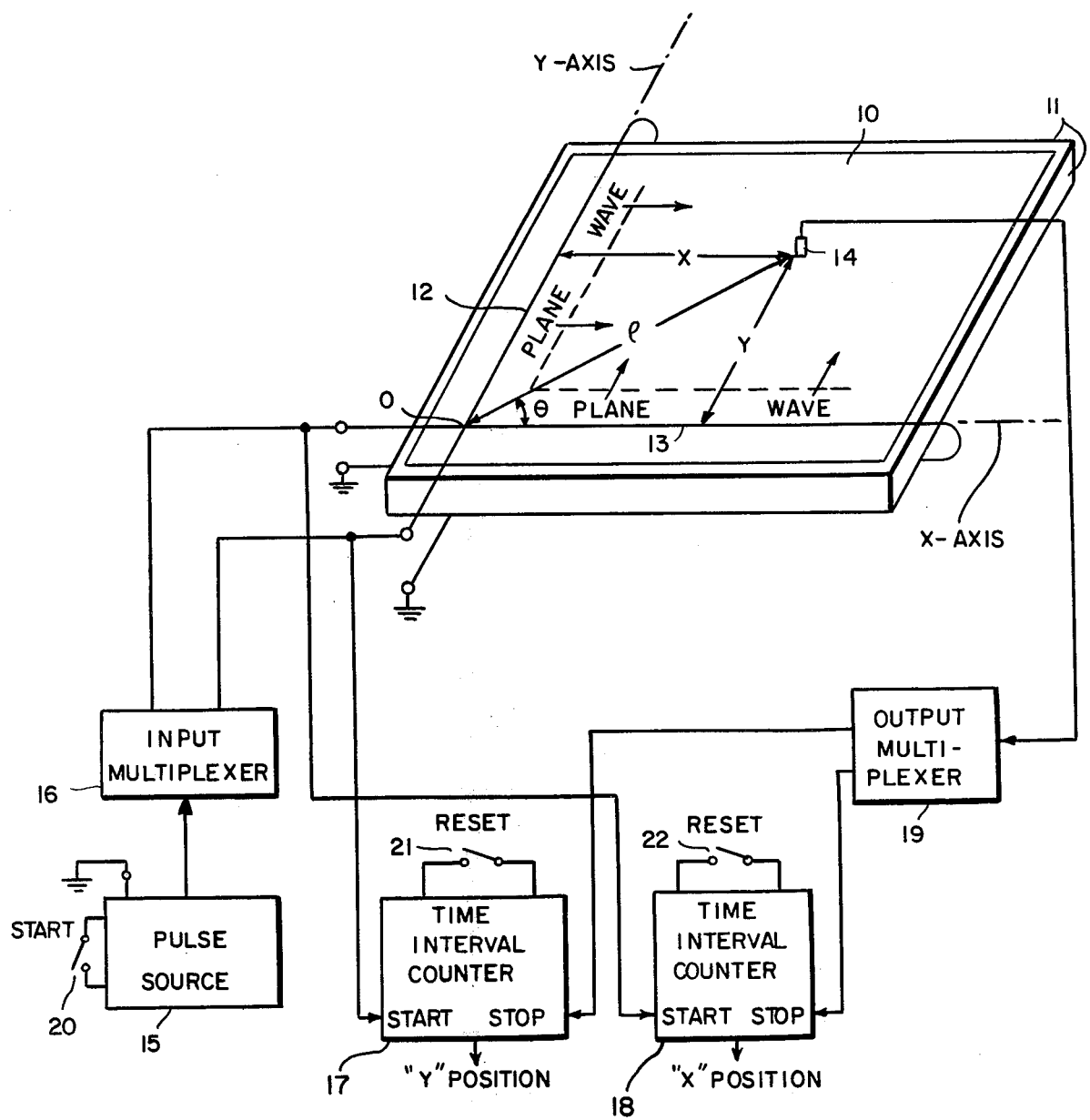
FIG. 1 shows a partial perspective, partial block diagram of a preferred embodiment of the invention.

A preferred embodiment of the invention for use with reference to a planar surface is depicted in FIG. 1. As can be seen therein, the planar surface comprises a sheet 10 of magnetostrictive material, e.g., ferromagnetic material, which has appropriate vibration damping material 11, such as damped rubber, at its edges to prevent reflections of an elastic wave at the discontinuities formed by such edges. Plane wave producing members which in the embodiment shown may be single loops of wire 12 and 13, extend along orthogonal edges thereof adjacent but not touching the surface 10, as shown, and intersect each other at a cross-over region identified as a reference point of origin "O". A receiver transducer 14, which may be a moving coil adjacent but not touching the surface 10, is movably positioned with reference to the surface of sheet 10, and the position of such receiver transducer is to be determined. If the alignment of elastic plane-wave producing member 12 corresponds to the Y axis and that of plane-wave producing member 13 corresponds to the X axis, the position of receiver transducer 14 can be expressed in terms of the X and Y coordinate distances relative to the point of origin "O".

An electrical signal source 15 as activated by a "START" switch 20 is utilized to supply signals to excite wire loops 12 and 13 in a multiplexed manner by multiplexer 16, the excitation thereof thereby generating plane elastic waves having electromagnetic fields associated therewith, which plane waves travel in the ferromagnetic sheet due to the magnetostriction phenomena. The signals supplied to plane-wave producing members 12 and 13 may be pulses or continuous wave signals and, for purposes of clarity, the description herein is based on the supplying of pulse signals from source 15. Magnetic bias can be provided by either superimposing a DC signal on the pulse signal or by using long strip permanent magnets along the coils.

The excitation of coils 12 and 13 produces plane elastic waves which travel in the X and Y directions, respectively, as depicted in FIG. 1. As each plane wave passes by receiver transducer 14 such transducer detects the presence of the electromagnetic field associated therewith and supplies an electrical signal at its output.

The time of travel of the plane waves from members 12 and 13 to receiver transducer 14 is a measurement of the X-Y coordinate distances therebetween. Such distances can be determined by a pair of appropriate time interval counter devices 17 and 18, for example. The pulse signal from source 15 used to excite loop 12 is supplied to the start input of counter 17 while that used to excite loop 13 is supplied to the start input of counter 18. The multiplexed outputs from receiver transducer 14 are supplied to the stop inputs of counters 17 and 18 to stop the counts thereof. The counter outputs thereby represent the X and Y distances traveled by the plane elastic waves and thereby determine the X and Y position relative to reference origin O. Counters 17 and 18 can thereupon be appropriately reset, as would be well known to the art, as shown symbolically by "RESET" switches 21 and 22, it being understood that such reset process can be performed manually or automatically, as desired.

Since the plane waves which are produced at each of members 12 and 13 extend continuously from the point of origin along corresponding edges of sheet 10 corresponding to each coordinate, the resolution of the system is effectively infinite and detection of continuous changes in the position of receiver transducer 14 relative to the surface can be achieved.

While the embodiment of FIG. 1 is described with reference to the use of a pulse system, as mentioned above, it is possible to utilize continuous wave signals for exciting loops 12 and 13 to produce the plane elastic continuous wave signals. The distances can then be determined by comparing the phases of the received signal substantially in a manner shown and described in my previously issued U.S. Pat. No. 4,035,762 issued on July 12, 1977.

The radial distance from the origin to the receiver transducer (shown as the distance "$\rho$" in FIG. 1) can be thereupon determined by computing the value $\sqrt{X^2+Y^2}$ in accordance with well-known calculation techniques. Moreover, the angle $\theta$ shown in FIG. 1 can also be calculated from the measurements on the X any Y coordinates through appropriate calculation of the value $\tan^{-1} Y/X$.

Figure 2:
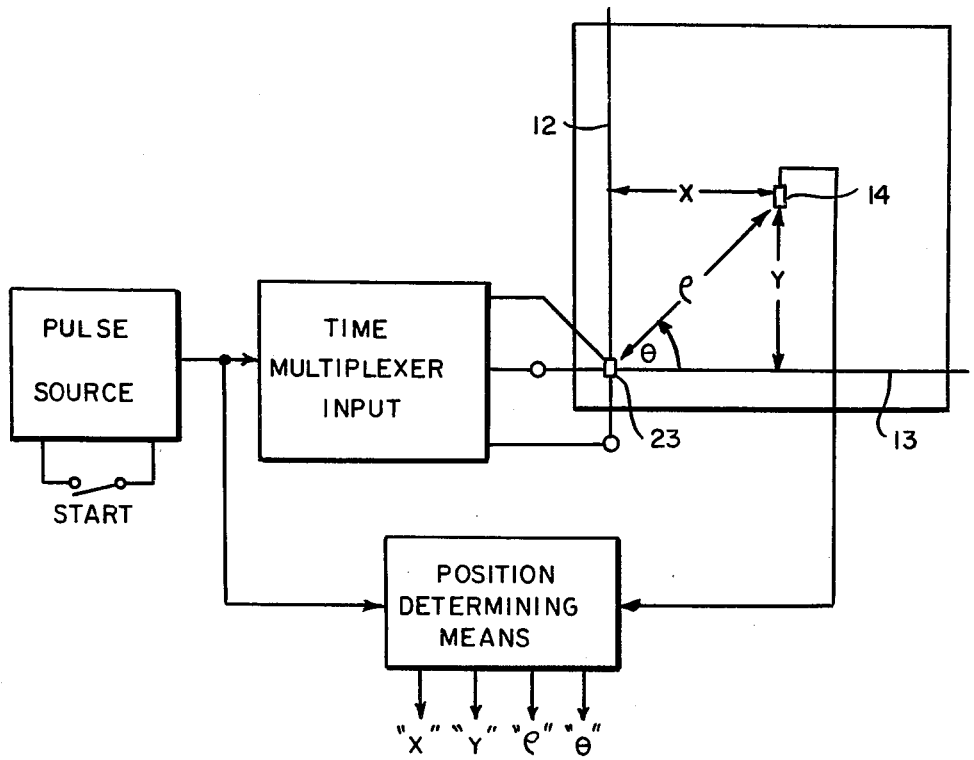
FIG. 2 shows a partial plan view, partial block diagram of another embodiment of the invention.

The radial distance "$\rho$" can also be determined directly without the necessity for making the above square-root calculation by fixedly positioning a transmitting transducer 23 of substantially the same type as receiver transducer 14 at the origin "O", as shown in FIG. 2, and exciting transducer 23 with an appropriate pulse or CW signal, suitably multiplexed with the signals for generating the plane wave signals. The excitation of such transmitting transducer will produce an omni-directional traveling elastic wave having electromagnetic fields associated therewith within the ferromagnetic sheet material, the presence of which can also be detected by receiver transducer 14 as it travels past transducer 14. Such operation will permit a direct determination of the distance between the transducer 23 and 14. Such distance then directly represents the radial distance "$\rho$" as desired, without the necessity for the square-root calculation discussed above. The latter positions must still be determined in order, if needed, to determine the angle "$\theta$" as discussed above. Thus, the position of receiver transducer 14 can be determined either in Cartesian (i.e., X,Y) coordinates or in polar (i.e., $\rho,\theta$) coordinates, as desired.

Figure 3:
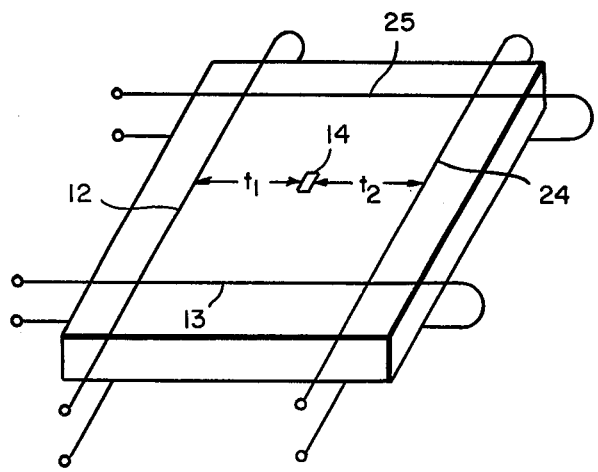
FIG. 3 shows an alternative embodiment of a portion of the invention of FIG. 1 useful in compensating for temperature changes.

FIG. 3 shows a modified system of the invention which provides compensation for temperature changes which affect the position determination because of variations in the velocity of propagation of the plane waves in the mechanism resulting from changes in temperature thereof. As can be seen in FIG. 3, additional plane wave receiver transducers 24 and 25 are positioned at opposite edges of surface 10 from the driver transducers 12 and 13, respectively. The determination of position using the plane wave signals generated by driver transducers 12 and 13 can be calculated in terms of the times of travel thereof from transducers 12 and 13 to transducer 14 and to transducers 24 and 25. Thus, as shown in FIG. 3, the X-coordinated position can be determined, for example, in accordance with the ratio of the time of travel $t_1$ from transducer 12 to transducer 14 to the total time of travel, $t_1+t_2$, from transducer 12 to transducer 24, i.e., the ratio $t_1/(t_1+t_2)$. A similar ratio will exist for the Y-coordinate measurement. If the temperature varies, the percentage changes in the time $t_1$ and in the total time $t_1+t_2$ will be the same so that the ratio thereof remains constant with such temperature changes. A similar calculation, compensating for changes in the velocity of propagation (as due to changes in temperature, for example) has been discussed in U.S. Pat. No. 4,028,619 issued to G. L. Edwards on June 7, 1977, although such patent does not in any way discuss such calculations in the context of the invention as described here in FIG. 3.

While the above discussion describes various embodiments of the invention, modifications thereof will occur to those in the art within the spirit and scope of the invention. Thus the driver and receiver transducers involved may have periodic configurations. Further, while the delay element is described as a magnetostrictive material using electromagnetic coupling, the invention is not limited either to such material or to such coupling technique. For example, conductive materials, wherein the transduction mechanism is based on Lorentz forces, can be used. Furthermore, electrostatic transduction can be used to generate electrostatic plane waves in piezoelectric materials or magnetostatic plane waves in magnetic materials, as would be known to the art. In any event the traveling signals have electromagnetic fields associated therewith, the term electromagnetic fields as used herein being intended to include electrostatic and magnetostatic fields.

Moreover, the surface of the planar member can be fabricated using various techniques, such as by plating, by using electroforming techniques, by using powder metallurgy techniques, deposition techniques, or other processes within the skill of the art.

To avoid the necessity for time multiplexing, signals of two different frequencies can be simultaneously supplied to the driver transducers and the signals from the receiver transducers appropriately filtered and supplied substantially simultaneously to separate position determining means. Further, temperature compensation may be alternatively provided for by using phase-locked loop techniques with respect to each of the X and Y coordinate determinations, in substantially the same manner as explained in my previously issued U.S. Pat. No. 4,035,762, issued on July 12, 1977.

Hence, the invention is not to be construed as limited to the particular embodiments shown and described above, except as defined by the appended claims.

What is claimed is:

1. A system for determining a position on the surface of a member capable of supporting elastic traveling waves having electromagnetic fields associated therewith, said system comprising
   first distributed transducer means for generating a first continuous elastic plane wave signal having an electromagnetic field associated therewith which travels in said member in a first direction;
   second distributed transducer means for generating a second continuous elastic plane wave signal having an electromagnetic field associated therewith which travels in said member in a second direction at a selected angle with reference to said first direction;
   means for detecting the presence of the electromagnetic fields associated with said first and second continuous plane wave signals as said signals travel past said detecting means, said detecting means being located at a position to be determined;
   means responsive to the phases of said continuous plane wave signals detected at said detecting means and to the phases of the corresponding signals at said first and second distributed transducer generating means for determining the respective distances from said first and second generating means to said detecting means; and
   means for substantially reducing reflections of said traveling continuous elastic plane waves in said member.

2. A system in accordance with claim 1 wherein said member comprises magnetostrictive material.

3. A system in accordance with claim 1 wherein said member comprises piezoelectric material.

4. A system in accordance with claim 1 wherein said member comprises electrically conductive material.

5. A system in accordance with claim 1 wherein said selected angle is such that said first and second directions are orthogonal.

6. A system in accordance with claim 5 wherein
   said first generating means and said second generating means are distributed and extend along directions which represent two orthogonal coordinates intersecting at a reference point of origin; and
   said respective distances represent the distances from said reference point of origin along the direction of each of said coordinates.

7. A system in accordance with claims 1 or 6 wherein said first generating means and said second generating means comprise
   first and second distributed transducer means extending in first and second coordinate directions; and
   signal excitation means for applying a continuous electrical signal to each of said first and second continuous distributed transducer means so as to generate said first and second elastic plane wave signals.

8. A system in accordance with claim 7 wherein said first and second distributed transducer means each comprise wire loop means positioned adjacent the surface of said member and extending along said first and second directions, respectively.

9. A system in accordance with claim 7 and further including
   first time multiplexer means for applying said electrical signals to said continuous first and second distributed transducer means in a multiplexed manner; and second time multiplexer means for providing received continuous electrical signals from said detecting transducer means in a multiplexed manner.

10. A system in accordance with claim 1 wherein at least one of said first and second distributed transducer means and said detecting means has a periodic configuration.

11. A system in accordance with claim 1 and further including
at least one other detecting means located at a preselected position which is at preselected distances from each of said first and second generating means for detecting the presence of the electromagnetic fields associated with said first and second plane wave signals as they travel past said preselected positions; and
means for comparing the differences between the phases of the signals detected at said preselected position and the phases of the signals at said first and second generating means, respectively; and
means for changing the frequency of the signals at said first and second generating means to reduce said phase differences to zero to compensate for errors due to phase velocity variations of said traveling elastic plane wave signals which occur as a function of temperature change.

12. A system for determining a position on a planar surface of a member capable of supporting continuous elastic traveling wave signals therein, said system comprising
a first distributed transducer means extending along an X-coordinate direction capable of generating a first continuous elastic plane wave signal having an electromagnetic field associated therewith which travels in said member in a first direction substantially perpendicular to said X-coordinate direction;
a second distributed transducer means extending along a Y-coordinate direction and capable of generating a second continuous elastic plane wave signal having an electromagnetic field associated therewith which travels in said member in a second direction substantially perpendicular to said Y-coordinate direction, said X and Y coordinate directions being substantially orthogonal and intersecting at a reference point of origin;
signal excitation means for applying first and second continuous electrical signals to said first and second distributed transducer means to generate said first and second continuous plane wave signals;
receiver transducer means located at a position to be determined for detecting the presence of the electromagnetic fields associated with said first and second continuous plane wave signals as they travel past said receiver transducer means and for producing received continuous electrical signals in response thereto;
means responsive to the phases of said first and second applied continuous electrical signals and to the phases of said received continuous electrical signals for determining the position of said receiver transducer means in terms of the distances along said X and Y coordinate directions; and
means for substantially reducing reflections of said traveling continuous elastic plane wave signals in said member.

13. A system in accordance with claim 12 and further including
means responsive to said X and Y coordinate distances for calculating the distance between said reference point of origin and said receiver transducer means.

14. A system in accordance with claim 13 and further including
means responsive to said X and Y coordinate distances for calculating the angle with respect to one of said coordinate directions of a line representing the distance between said reference point of origin and said receiver and the position of said receiver transducer means.

15. A system in accordance with claims 12 or 14 and further including
an additional transducer means positioned at said reference point of origin for generating an omnidirectional continuous elastic traveling wave signal in said member;
said receiver transducer means detecting the presence of said omnidirectional continuous traveling wave signal as it travels past said receiver transducer means; and
means responsive to the phase of the continuous signal generated at said additional transducer means and to the phase of the continuous signal received at said receiver transducer means for determining the distance between said reference point of origin and said receiver transducer means.

16. A system for determining a position on the surface of a member capable of supporting elastic traveling waves having electromagnetic fields associated therewith, said system comprising
transducer means positioned at a selected reference point for generating an omnidirectional elastic plane wave signal having an electromagnetic field associated therewith which travels in said member;
means for detecting the presence of the electromagnetic fields associated with said omnidirectional elastic plane wave signal as said signal travels past said detecting means, said detecting means being located at a position to be determined; and
means responsive to said detecting means and to said transducer means for determining the distance from said reference point of origin to said detecting means.

17. A system for determining a position on the surface of a member comprising piezoelectric material capable of supporting electrostatic traveling waves having electromagnetic fields associated therewith, said system comprising
first electrostatic transduction means for generating a first electrostatic plane wave signal having an electromagnetic field associated therewith which travels in said piezoelectric member in a first direction;
second electrostatic transduction means for generating a second electrostatic plane wave signal having an electromagnetic field associated therewith which travels in said piezoelectric member in a second direction at a selected angle with reference to said first direction;
electrostatic transduction means for detecting the presence of the electromagnetic fields associated with said first and second electrostatic plane wave signals as said signals travel past said detecting means, said detecting means being located at a position to be determined; and
means responsive to said detecting means and to said first and second electrostatic transduction generating means for determining the respective distances from said first and second generating means to said detecting means.

18. A system for determining a position on the surface of a member comprising electrically conductive material capable of supporting elastic traveling waves having electromagnetic fields associated therewith, said system comprising first transducer means utilizing Lorentz forces for generating a first elastic plane wave signal having an electromagnetic field associated therewith which travels in said conductive member in a first direction;

second transducer means utilizing Lorentz forces for generating a second elastic plane wave signal having an electromagnetic field associated therewith which travels in said conductive member in a second direction at a selected angle with reference to said first direction;

means for detecting the presence of the electromagnetic fields associated therewith said first and second plane wave signals as said signals travel past said detecting means, said detecting means being located at a position to be determined; and means responsive to said detecting means and to said first and second transducer means for determining the respective distances from said first and second generating means to said detecting means.

19. A system for determining a position on the surface of a member capable of supporting elastic traveling waves having electromagnetic fields associated therewith, said system comprising first means for generating a first elastic plane wave signal at a first frequency having an electromagnetic field associated therewith which travels in said member in a first direction;

second means for generating, simultaneously with the generation of said first signal, a second elastic plane wave signal at a second frequency having an electromagnetic field associated therewith which travels in said member in a second direction at a selected angle with reference to said first direction;

means for detecting the presence of the electromagnetic fields associated therewith said first and second plane wave signals as said signals travel past said detecting means, said detecting means being located at a position to be determined;

means for providing said first and second detected signals separately and simultaneously; and means responsive to said separately provided first and second detected signals and to the signals at said first and second generating means for determining the respective distances from said first and second generating means to said detecting means.

* * * * *